G. JONTZ.
End-Gate for Wagons.

No. 224,697. Patented Feb. 17, 1880.

WITNESSES:
Henry N. Miller
C. Sedgwick

INVENTOR:
G. Jontz
BY Munn & Co
ATTORNEYS.

UNITED STATES PATENT OFFICE.

GEORGE JONTZ, OF WYANET, ILLINOIS.

END-GATE FOR WAGONS.

SPECIFICATION forming part of Letters Patent No. 224,697, dated February 17, 1880.

Application filed December 15, 1879.

*To all whom it may concern:*

Be it known that I, GEORGE JONTZ, of Wyanet, in the county of Bureau and State of Illinois, have invented a new and useful Improvement in End-Boards and Top-Boxes for Wagon-Bodies, of which the following is a specification.

Figure 1:
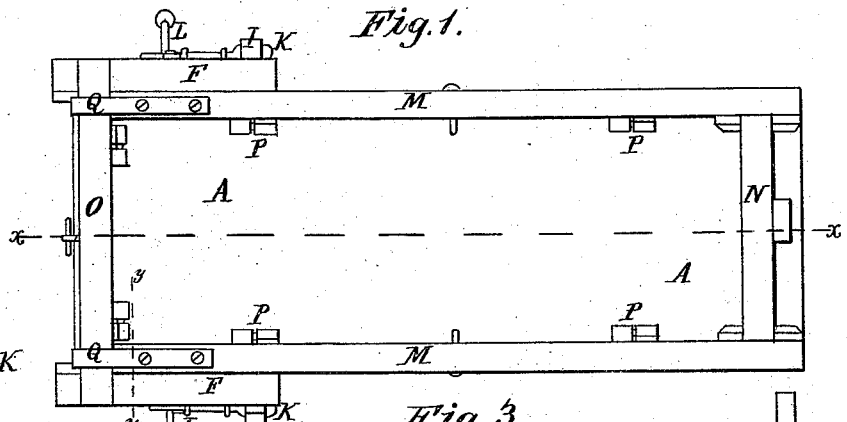
Figure 2:
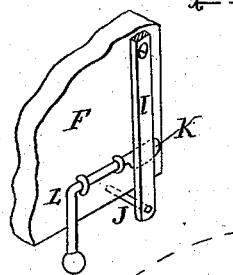
Figure 3:
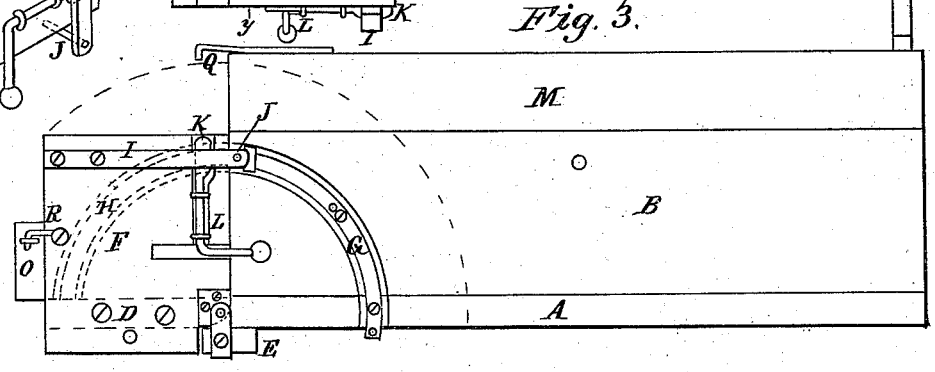
Figure 4:
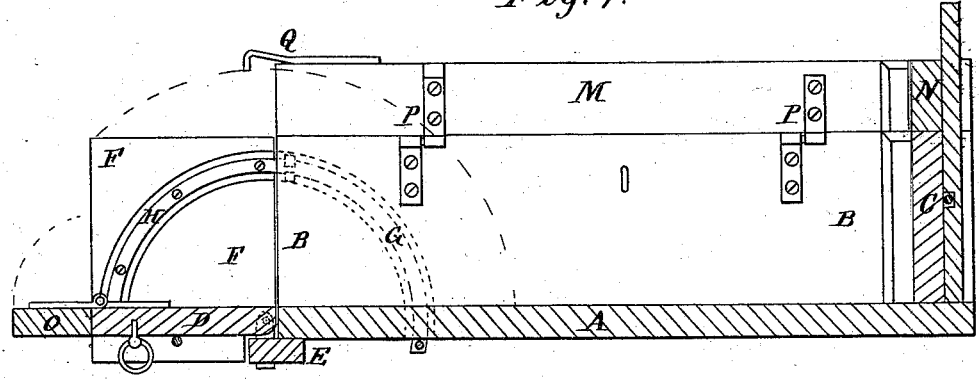
Figure 5:
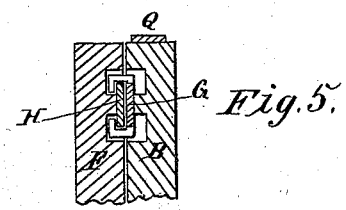

Figure 1 is a plan view of my improvement. Fig. 2 is a perspective view of one of the side catches. Fig. 3 is a side elevation. Fig. 4 is a sectional side elevation taken through the the line $x\ x$, Fig. 1. Fig. 5 is a section taken through the line $y\ y$, Fig. 1.

Similar letters of reference indicate corresponding parts.

The object of this invention is to furnish end-boards and top-boxes for wagon-bodies so constructed that the end-board may be adjusted for use as a shoveling-board and a dumping-board, and that the top-box may be readily detached.

The invention consists in the combination, with the side-boards and the hinged end-board of a wagon-body, of devices for securing the end-board in vertical, inclined, and horizontal positions and for converting the end-board into a feed-trough.

A represents the bottom-boards, B the side-boards, C the forward end-board, and D the rear end-board, of a wagon-body. The rear end-board, D, is hinged at its lower edge to a cross-bar, E, attached to the lower side of the rear ends of the bottom-boards A. The rear end-board, D, has side-boards or wings F attached to its ends, and is made enough longer than the width of the wagon-body to allow the side-boards or wings F to overlap the side-boards B, as shown in Fig. 1. To the outer surface of the side-boards B and the inner surface of the side-boards or wings F are attached corresponding semicircular strips G H, which are dovetailed to each other, or are provided with sliding clasps to hold the said side-boards B F close together, in whatever position the end-board D may be placed. The side-boards B F are grooved to receive the metal strips G H, so that the adjacent surfaces of the said side-boards B F may be close together.

To the outer sides of the wings F are attached springs I, the ends of which project and have pins J attached to them to enter holes in the strips G, and thus hold the end-board D securely in any position into which it may be adjusted.

The spring-catches I J are withdrawn to allow the end-board D to be adjusted by cams K, placed beneath the springs I, and which are formed upon the ends of bent levers L, pivoted in grooves in the wings F, as shown in Fig. 3.

With this construction the end-board D can be lowered into and secured in an inclined position, to serve as a shoveling-board for convenience in unloading corn in the ear or other substance requiring to be unloaded with a shovel; or the end-board D may be turned down into line with the bottom-boards A, to serve as a dumping-board in unloading grain or other substance that can be dumped, and allow lumber and other things longer than the wagon-body to be carried without detaching the said end-board D.

M are the side-boards, N is the forward end-board, and O is the rear end-board, of the top-box. The side-boards M are hinged to the side-boards B by detachable hinges P, as shown in Figs. 1 and 4, so that they can be readily detached when it is desired to remove the top side-boards, M. The forward end-board, N, is inserted between cleats attached to the side-boards M. The rear end-board, O, is hinged to the rear end-board, D, as shown in Fig. 4, and rests against the rear ends of the side-boards M, where it is secured in place by the catch-hooks Q, attached to the upper edges of the rear ends of the side-boards M, and which project, as shown in Figs. 3 and 4, to receive the said end-board O.

With this construction, when the end-board D has been lowered into a horizontal position, the top end-board, O, can be turned up against the edges of the wings F and secured by hooks and eyes R, as shown in Fig. 4, so that the rear end-board can be used as a trough for feeding the team. With this construction the top-box M N O cannot rise and allow small grain or other small articles of loading to escape between it and the main box B C D while passing from place to place.

Having thus described my invention, I claim as new and desire to secure by Letters Patent—

1. In a wagon-body, the combination, with the wings F and the guard-strips G H, of the spring-catches I J, substantially as herein shown and described, for locking the end-board D in place, as set forth.

2. In a wagon-body, the combination, with the spring-catches I J, of the cams K and levers L, for unlocking the end-board D, as set forth.

GEORGE JONTZ.

Witnesses:
T. CLARK HAYS,
CHARLES R. HAYS.